Aug. 8, 1933.　　　　O. J. HORGER　　　1,921,883

PLAIN ROLLER BEARING JOURNAL BOX

Filed Aug. 17, 1931　　　2 Sheets-Sheet 1

INVENTOR:
Oscar J. Horger,
by Canton & Gravely,
HIS ATTORNEYS.

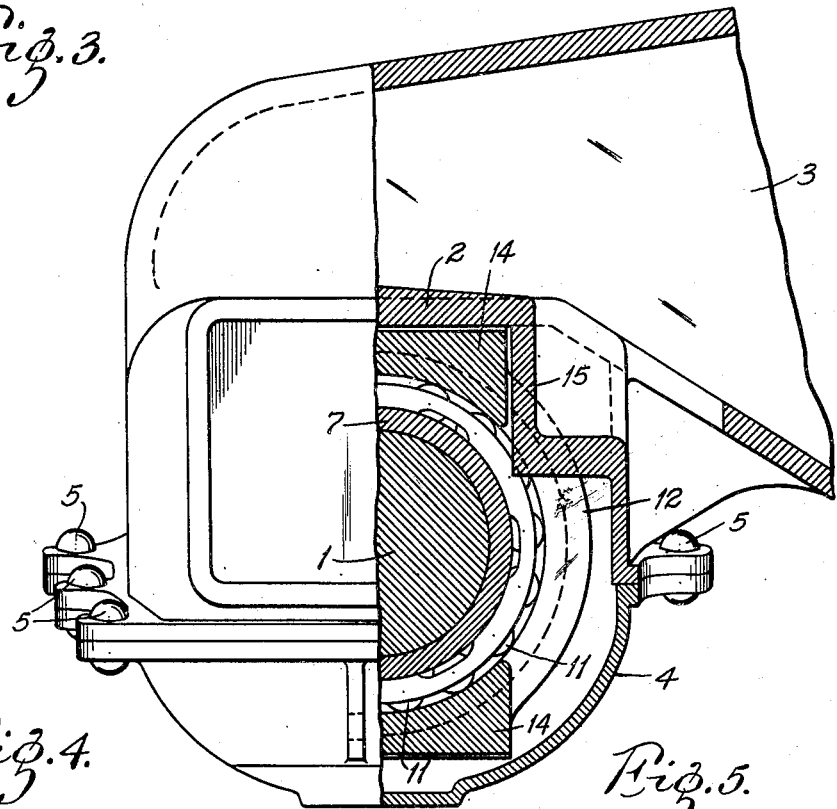
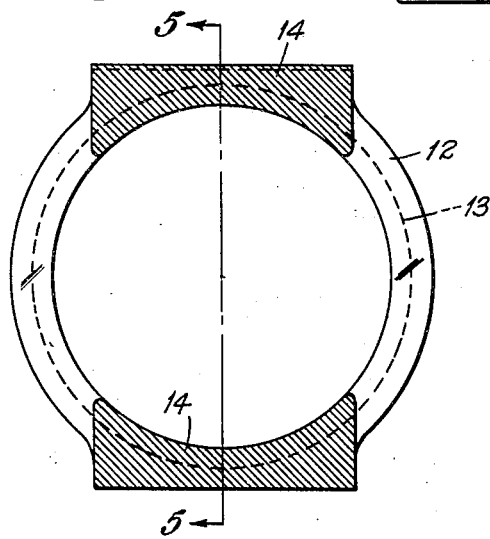
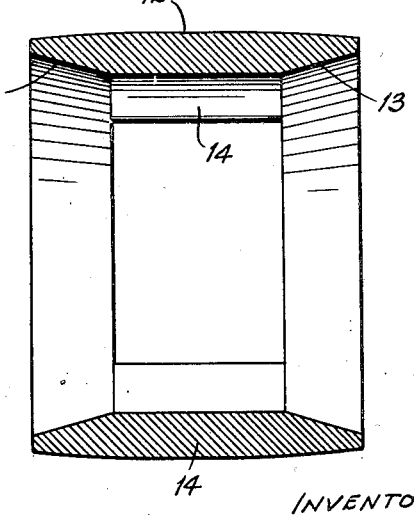

Patented Aug. 8, 1933

1,921,883

UNITED STATES PATENT OFFICE 1,921,883

PLAIN-ROLLER BEARING JOURNAL BOX

Oscar J. Horger, Canton, Ohio, assignor to The Timken Roller Bearing Company, Canton, Ohio, a Corporation of Ohio Application August 17, 1931. Serial No. 557,542

3 Claims. (Cl. 308—180)

My invention relates to journal box constructions for railway rolling stock particularly, to journal boxes adapted to accommodate both roller bearings and the usual plain bearings or brasses. The invention has for its principal object a journal box construction that is easily adapted to accommodate both types of bearings, without requiring the use of complicated adapter devices.

The invention consists principally in providing a roller bearing construction that is adapted to cooperate with journal box members that are intended or adapted to accommodate plain bearings. The invention consists in the plain-roller bearing journal box and the combinations and arrangements of parts hereinafter described and claimed.

Figure 1:
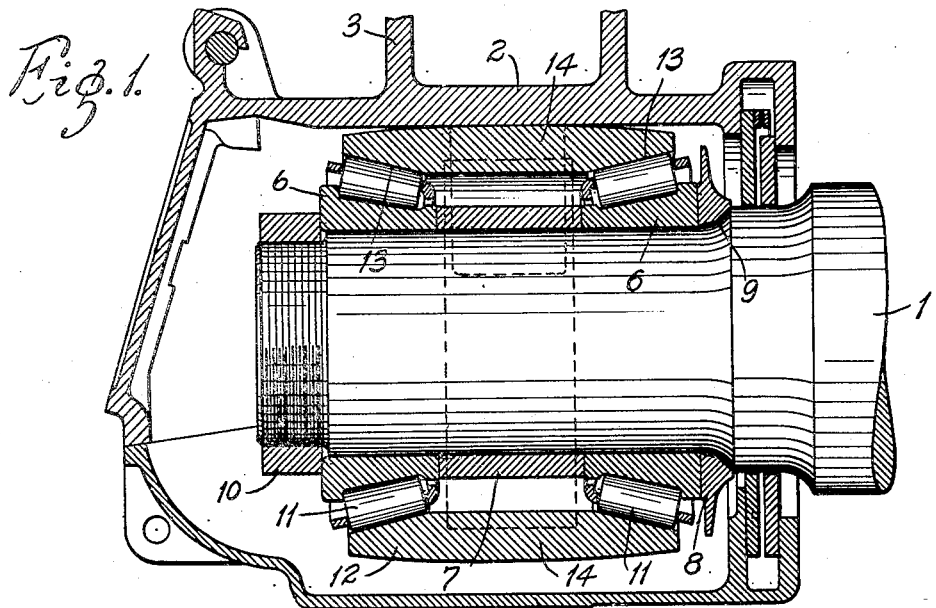
Figure 2:
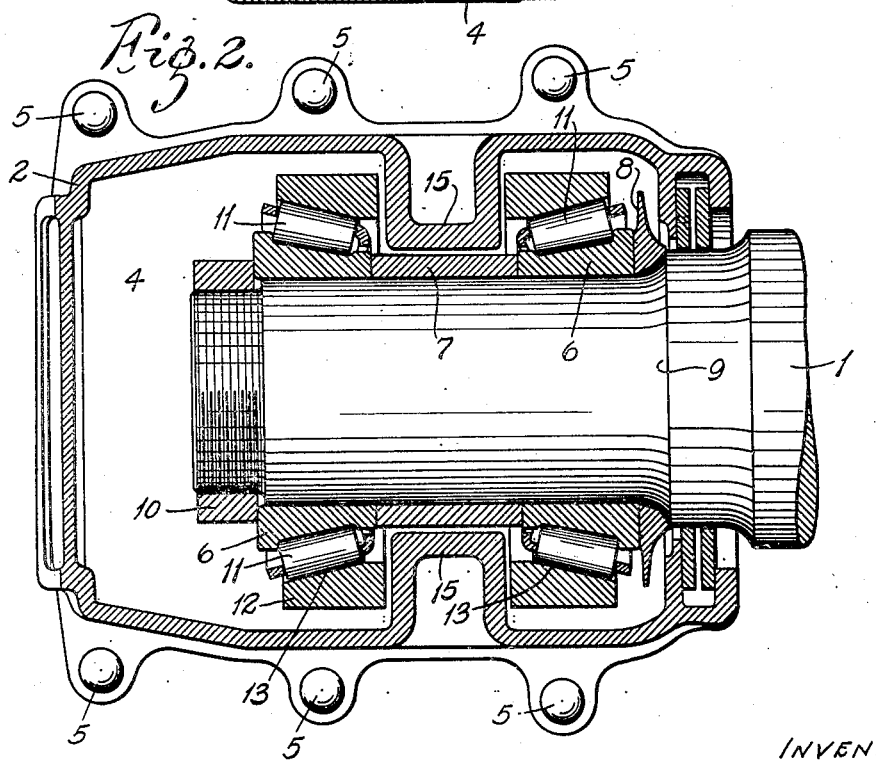

In the accompanying drawings,

Fig. 1 is a longitudinal vertical sectional view of a journal box embodying my invention, Fig. 2 is a horizontal sectional view, Fig. 3 is a view partly in vertical cross-section and partly in end elevation, Fig. 4 is a cross-section; and Fig. 5 is a longitudinal section of the bearing cup member.

In the drawings is illustrated a railway car axle 1 that extends into a journal box including a top portion 2 that is integral with a truck side frame 3 and a separate lower portion 4 secured to said upper portion as by bolts or rivets 5. Mounted on the axle 1 are two conical inner bearing members 6 with the smaller ends of their races disposed inwardly. Said inner bearing members or cones 6 are spaced apart by a sleeve 7. The innermost cone 6 abuts against a collar 8 that is seated on a shoulder 9 on the axle and the outermost bearing cone 6 abuts against a nut 10 at the end of the axle.

Mounted on said cones 6 are conical rollers 11. A double outer bearing member or cup 12 includes a race member 13 for each set of rollers. The outer surface of each race member is convexly curved or tapered endwise of the axle and journal box. At the top and bottom, said race members 13 are connected by bridge members 14, whose outer surfaces are shaped to conform to the extended outer surfaces of said race members. The upper part 2 of the journal box 2 is provided with inwardly extending projections 15 designed to cooperate with the wedges or other parts of the usual A. R. A. or other plain bearing construction.

The bearing cup member 12 is disposed in the journal box so that one of the bridge members 14 is at the top, resting against the undersurface of the top of the journal box. The tapering or convexly curved form of the race members 13 and of the connecting bridge 14 provides contact of the middle portion only thereof with the journal box, thereby permitting a rocking movement of the axle and bearing member with respect to the journal box. The projections 15 of the journal box extend into the spaces between the race members 13 on either side of said bridges 14. The spaces between said race members will normally be somewhat greater than the width or thickness of said projections 15, thereby permitting endwise movement of the axle and bearings with respect to the journal box.

The above described construction includes a simple form or roller bearing construction that is adapted for use with journal boxes that can accommodate plain bearings. The roller bearing is quite simple in construction, but is strong and durable.

What I claim is:

1. A roller bearing for railway car axle constructions comprising spaced rings or outer race members and an annular series of rollers for each ring and connecting bridges at the tops and bottoms of such outer race members and integral therewith, whereby said race members are adapted to receive projections of said journal boxes designed for cooperation with plain bearing members.

2. A roller bearing for railway car axle constructions comprising spaced rings or outer race members and an annular series of rollers for each ring and connecting bridges at the tops and bottoms of such outer race members and integral therewith, one of said connecting bridges being adapted and arranged to engage the undersurface of a journal box that will accommodate plain bearings and the spaces between said race members being large enough to receive projections of said journal boxes designed for cooperation with plain bearing members.

3. A roller bearing for railway car axle constructions comprising spaced rings or outer race members and an annular series of rollers for each ring and connecting bridges at the tops and bottoms of such outer race members and integral therewith, said outer race members and connecting bridges being convexly curved from end to end, and adapted to engage the undersurface of a journal box that will accommodate plain bearings and the spaces between said outer race members being large enough to loosely receive projections of said journal boxes adapted for cooperation with plain bearing members.

OSCAR J. HORGER.